United States Patent [19]

Dunn

[11] Patent Number: 4,514,851

[45] Date of Patent: Apr. 30, 1985

[54] ARC CIRCUIT ELECTRODES FOR ARC GLASS-MELTING FURNACE

[75] Inventor: Charles S. Dunn, Pataskala, Ohio

[73] Assignee: Owens-Corning Fiberglas Corporation, Toledo, Ohio

[21] Appl. No.: 342,852

[22] Filed: Jan. 26, 1982

[51] Int. Cl.³ ............................................. C03B 5/02
[52] U.S. Cl. ........................................ 373/27; 373/30
[58] Field of Search .................. 373/27, 39, 40, 41, 373/3, 60, 102, 30

[56]  References Cited

U.S. PATENT DOCUMENTS 2,314,956  3/1943  Slayter et al. ..................... 373/40
3,302,352  2/1967  Flexon et al. ................... 373/27 X Primary Examiner—Roy N. Envall, Jr.
Attorney, Agent, or Firm—Ronald C. Hudgens; Patrick P. Pacella

[57] ABSTRACT

An arc glass-melting furnace comprising: a chamber adapted for holding a body of molten glass, such chamber including means for supplying batch material thereto and means for withdrawing molten glass therefrom; an arc electrode positioned in the chamber above the upper surface of the body of molten glass; a plurality of electrodes positioned in the bottom of the chamber; and power supply means having a first terminal connected to the arc electrode and a second terminal connected to the plurality of bottom electrodes.

6 Claims, 3 Drawing Figures

ARC CIRCUIT ELECTRODES FOR ARC GLASS-MELTING FURNACE

BACKGROUND OF THE INVENTION

This invention relates to the production of glass fibers, e.g., fibers made by melting particulate batch ingredients or minerals, including basalt and the like, and, more particularly, to an arc furnace for producing such glass fibers.

Prior art arc furnaces, such as that disclosed in Slayter et al., U.S. Pat. No. 2,280,101, employ side entering electrodes to complete the electric circuit of the arc electrode. It has been found that the side entering electrodes cause hot spots in the sidewall refractory and also cause such refractory to erode quickly. The temperatures in an arc furnace are greatest at the glass-batch interface and, consequently, refractory wear is also greatest at the melter sidewalls near the glass-batch interface. In the prior art the sidewalls have been constructed of a high resistance refractory material, such as fused cast alumina and zirconia, which does not have the wear properties that are exhibited by low resistance refractory material, such as chromic oxide. The high resistance refractory material has been utilized in the prior art arc furnaces to prevent electrical short circuiting through the melter sidewall refractory. However, such refractories have been unacceptable since they tend to wear rather rapidly. Another problem encountered in arc furnaces with side entering electrodes is the impossibility of restarting the arc if the glass level in the melter drops below the side electrodes.

In prior art arc furnaces, such as that disclosed in Eimer, U.S. Pat. No. 1,438,936, a single bottom entering electrode has been employed to complete the electric circuit for the arc electrode. However, it has been found that such furnaces tend to produce a hot spot or streak through the center of the furnace between the arc electrode and the bottom entering electrode. This hot streak through the center of the furnace provides an unbalanced temperature distribution and hence limited control of the temperature of the glass exiting from the furnace.

Therefore, it is an object of the present invention to provide an arc furnace for melting glass that minimizes the sidewall refractory wear, minimizes hot spots in both the sidewall refractory and in the molten glass itself, and provides a uniform temperature distribution and good exit temperature control.

SUMMARY OF THE INVENTION

In accordance with the present invention there is provided an arc glass-melting furnace comprising a chamber adapted for holding a body of molten glass, such chamber having means for supplying batch material thereto and also means for withdrawing molten glass therefrom. An arc electrode is positioned in the chamber above the upper surface of the molten glass, and a plurality of electrodes are positioned in the bottom of the chamber. A power supply means is connected across the arc electrode and the plurality of bottom electrodes.

In addition, the present invention provides an arc glass-melting furnace having three arc electrodes positioned in the chamber above the upper surface of the body of molten glass. A three phase power supply connected in a wye-configuration is connected to the three arc electrodes with the common point being connected to the bottom electrodes. Still further, the electric glass-melting furnace of the present invention may include a chamber that has a bottom wall made of high resistivity refractory material and sidewalls made of low resistivity refractory material, having a slower wear rate than that of the bottom wall refractory, and may include additional electrodes positioned in the bottom of the chamber for Joulean heating of the glass.

The bottom entering electrodes of the present invention decrease the melter sidewall temperature thereby increasing the useful life of the sidewall refractory. The elimination of the side entering electrodes allows the use of refractory, such as chromic oxide, which has a superior wear rate to that of the prior art arc furnaces using side entering electrodes, thereby obtaining longer service from the furnace before a rebuild is necessary. The present invention also eliminates hot spots or streaking through the center of the melter to provide uniform heating and temperature distribution in the furnace, thus preventing devitrification of the glass that is not in the center of the melter. Added flexibility and control can be provided by the resistive heating electrodes that may be incorporated in the bottom of the furnace; these Joulean electrodes insure control of the exit temperature of the glass and allow glass composition changes with minimal problems. When both the arc and resistive heating are used, the furnace is operated such that the arc circuit primarily provides the power for melting and the resistive heating circuit primarily provides the power for temperature control of the exiting glass.

Other objectives, advantages and applications of the present invention will be made apparent by the following detailed description of the preferred embodiments of the invention.

DETAILED DESCRIPTION OF THE PREFERRED EMBODIMENTS

Figure 1:
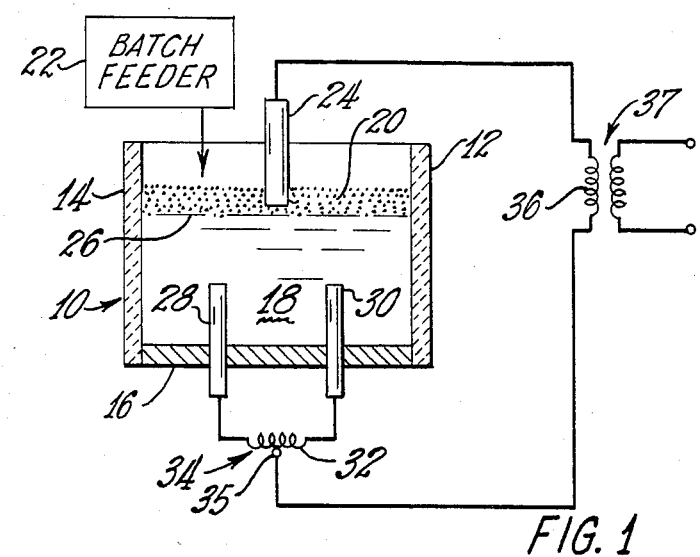
FIG. 1 is a partial diagrammatic view in longitudinal cross section of an arc glass-melting furnace utilizing the present invention.

Referring to FIG. 1, an arc glass-melting furnace utilizing the present invention is indicated generally by numeral 10. Furnace 10 has sidewalls 12 and 14 which are made of a refractory material having superior wear characteristics, such as chromic oxide, and a bottom wall 16 which is made of refractory material having a high resistance in relation to the resistance of the molten glass, such as fused cast alumina and zirconia. Furnace 10 contains a pool of molten glass 18 and a supply of batch material 20 which is fed from a batch feeder shown generally by numeral 22. Preferably, batch feeder 22 is a batch feeder system as disclosed in the copending patent application of Charles S. Dunn et al., Ser. No. 342,853, which was filed on the same day as the instant application now U.S. Pat. No. 4,385,918, issued May 31, 1983, and is assigned to a common assignee.

An arc electrode 24 is positioned above upper surface 26 of pool of molten glass 18. Electrodes 28 and 30 are inserted through apertures in bottom wall 16 into molten glass 18 such that they are equidistant vertically and axially from arc electrode 24. One end of coil 32 of magnetic reactor 34 is connected to electrode 28, and the other end is connected to electrode 30. Center tap 35 of coil 32 is connected to one end of low voltage winding 36 of transformer 37; the other end of low voltage winding 36 is connected to arc electrode 24.

The power supplied by transformer 37 causes an electric arc to be formed between electrode 24 and upper surface 26 of molten glass 18 with electric current passing through molten glass 18 to electrodes 28 and 30. Magnetic reactor 34 insures that the current flow through electrodes 28 and 30 is balanced. If desired, but not preferred, magnetic reactor 34 may be eliminated with electrodes 28 and 30 being connected directly to low voltage winding 36. Electrodes 28 and 30 insure that the current flow is dispersed through molten glass 18 to create a uniform temperature throughout molten glass 18, thereby preventing hot spots or streaking.

Figure 2:
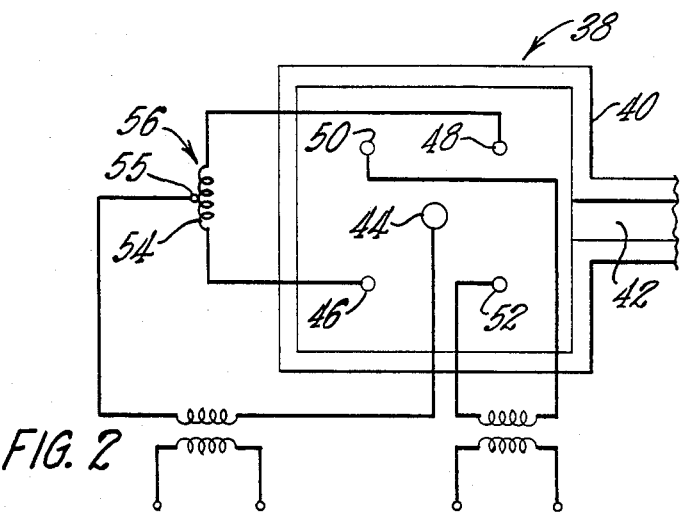
FIG. 2 is a diagrammatic plan view of an alternate embodiment according to the present invention.

Referring to FIG. 2 an alternate embodiment of the present invention is shown in which Joulean electrodes are utilized in the bottom of the furnace to provide greater temperature control of the glass exiting from the furnace. Furnace 38 has a melting tank 40 from which the molten glass may be removed through throat 42. Arc electrode 44 is positioned generally in the center of melting tank 40 above the upper surface of the molten glass. Electrodes 46, 48, 50 and 52 are positioned in melting tank 40 such that they are equally spaced vertically and axially from arc electrode 44, such electrodes forming a rectangle around arc electrode 44 with electrodes 46 and 48 being located on one diagonal and electrodes 50 and 52 being located on the other diagonal. Electrodes 46 and 48 are respectively connected to opposite ends of coil 54 of magnetic reactor 56. Center tap 55 of coil 54 is connected to one end of secondary winding 57 of transformer 58; the other end of secondary winding 57 is connected to arc electrode 44. Electrode 50 is connected to one end of secondary winding 59 of transformer 60, and electrode 52 is connected to the other end thereof.

As described hereinabove, an arc is created between arc electrode 44 and the upper surface of the molten glass with the circuit being completed through the molten glass to electrodes 46 and 48. Electrodes 50 and 52 are utilized for resistive type heating to provide more accurate control of the molten glass exiting through throat 42. Furnace 38 is operated such that the arc circuit primarily provides the heat necessary to melt the batch materials to form molten glass, and the Joulean circuit primarily provides the temperature control necessary for maintaining a uniform exit temperature of the molten glass.

Figure 3:
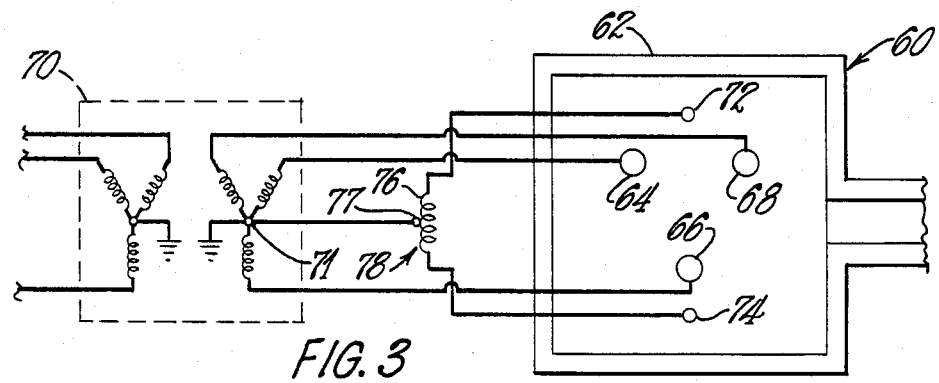
FIG. 3 is a diagrammatic plan view of an arc glass-melting furnace utilizing the present invention in a three phase configuration.

Referring to FIG. 3, a furnace 60 is shown utilizing the present invention in a three phase embodiment. Furnace 60 has a melting tank 62 in which three arc electrodes, 64, 66 and 68, are symmetrically positioned above the upper surface of the molten glass. Each of arc electrodes 64, 66 and 68, is connected to a separate leg of the secondary of the three phase transformer bank shown generally by numeral 70. The secondary of transformer bank 70 is connected in a wye-configuration with common point 71 grounded. Electrodes 72 and 74 are positioned in the bottom of melting tank 62 and are preferably located outside of the triangle formed by arc electrodes 64, 66, and 68. Electrodes 72 and 74 are respectively connected to opposite ends of coil 76 of magnetic reactance 78. Center tap 77 is connected to common point 71 of the low voltage winding of transformer bank 70.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

I claim:

1. An arc glass-melting furnace comprising: a chamber adapted for holding a body of molten glass, said chamber having means for supplying batch thereto and means for withdrawing molten glass therefrom; an arc electrode positioned in said chamber above the upper surface of said body of molten glass for establishing an arc between said arc electrode and said glass; a plurality of electrodes positioned in the bottom of said chamber; and means for supplying electrical power to said arc electrode and said plurality of bottom electrodes, said power supply means having a first terminal connected to said arc electrode and a second terminal connected to said plurality of bottom electrodes for establishing current flow in said glass between said arc electrode and said bottom electrodes which current is conducted within said arc electrode and said bottom electrodes.

2. An arc glass-melting furnace as recited in claim 1, wherein said arc electrode comprises three arc electrodes positioned in said chamber above the upper surface of said body of molten glass; and said power supply means comprises a three phase power supply connected in a wye-configuration with the common point being connected to said plurality of bottom electrodes and each of the other terminals being connected to one of said three arc electrodes.

3. An arc glass-melting furnace as recited in claim 1, wherein said furnace further comprises: a second plurality of electrodes positioned in the bottom of said chamber; and a second means for supplying electrical power, said second power supply means being connected to said second plurality of bottom electrodes such that said second power supply causes a current to flow between said second plurality of bottom electrodes thereby heating said body of molten glass by the Joule effect.

4. An arc glass-melting furnace as recited in claim 1, wherein said plurality of bottom electrodes are symmetrically positioned in the bottom of said furnace.

5. An arc glass-melting furnace as recited in claim 1, wherein said chamber has a bottom wall comprising a first refractory material having a first resistivity and a first wear rate and sidewalls comprising a second refractory material having a second resistivity and a second wear rate, said first resistivity being greater than said second resistivity and said first wear rate being greater than said second wear rate.

6. An arc glass-melting furnace as recited in claim 5, wherein said second refractory material comprises chromic oxide.

* * * * *